US010771199B2

(12) United States Patent
Sridhara et al.

(10) Patent No.: US 10,771,199 B2
(45) Date of Patent: Sep. 8, 2020

(54) METHODS AND APPARATUS FOR REVERSE LINK ACKNOWLEDGEMENT IN A WIRELESS LOCAL AREA NETWORK (WLAN)

(75) Inventors: Vinay Sridhara, Santa Clara, CA (US); Sanjiv Nanda, San Diego, CA (US); Alok Aggarwal, San Diego, CA (US); Vincent Knowles Jones, IV, Redwood City, CA (US); Geert Arnout Awater, Utrecht (NL); Santosh P. Abraham, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1573 days.

(21) Appl. No.: 12/329,890

(22) Filed: Dec. 8, 2008

(65) Prior Publication Data

US 2009/0252100 A1    Oct. 8, 2009

Related U.S. Application Data

(60) Provisional application No. 61/041,670, filed on Apr. 2, 2008, provisional application No. 61/090,419, filed on Aug. 20, 2008.

(51) Int. Cl.
*H04L 1/18* (2006.01)
*H04W 84/12* (2009.01)
(Continued)

(52) U.S. Cl.
CPC .......... *H04L 1/1854* (2013.01); *H04L 1/1614* (2013.01); *H04L 2001/0093* (2013.01); *H04W 84/12* (2013.01)

(58) Field of Classification Search
CPC ..... H04W 72/00; H04W 72/04; H04W 72/12; H04W 8/24; H04J 3/06; H04L 2209/34
(Continued)

(56) References Cited

U.S. PATENT DOCUMENTS 5,528,605 A    6/1996 Ywoskus et al.
5,754,754 A    5/1998 Dudley et al.
(Continued)

FOREIGN PATENT DOCUMENTS

CN    1689262 A    10/2005
CN    1691663 A    11/2005
(Continued)

OTHER PUBLICATIONS

International Preliminary Report on Patentability—PCT/US2010/022611, The International Bureau of WIPO—Geneva, Switzerland, dated Feb. 25, 2011.
(Continued)

*Primary Examiner* — Kwang B Yao
*Assistant Examiner* — Syed M Bokhari
(74) *Attorney, Agent, or Firm* — Patterson & Sheridan, L.L.P

(57) ABSTRACT

Methods and apparatus for reverse link acknowledgement in a wireless local area network. A method includes receiving, at a first node, a data communication over a common channel, the data communication being decodable by other nodes. The method also includes determining transmission resources from the data communication, wherein the transmission resources are different for each node, and transmitting a response over the common channel using the determined transmission resources. An apparatus includes a transmitter configured to transmit to a plurality of nodes a data communication over the common channel, and a receiver configured to receive responses from the plurality of nodes, wherein each response was sent using different transmission resources determined from the data communication.

31 Claims, 7 Drawing Sheets

(51) Int. Cl.
*H04L 1/00* (2006.01)
*H04L 1/16* (2006.01)

(58) Field of Classification Search
USPC ....... 370/432, 208, 328, 349, 350, 329, 236, 370/278, 389, 471; 455/68, 450
See application file for complete search history.

(56) References Cited

U.S. PATENT DOCUMENTS

| | | | |
|---|---|---|---|
| 7,120,852 | B2 | 10/2006 | Terry et al. |
| 7,463,642 | B2* | 12/2008 | Qian ........................... 370/432 |
| 7,804,762 | B2* | 9/2010 | Stephens et al. ............ 370/208 |
| 2004/0156443 | A1 | 8/2004 | Dent |
| 2005/0015703 | A1 | 1/2005 | Terry et al. |
| 2005/0068895 | A1 | 3/2005 | Stephens et al. |
| 2005/0169232 | A1 | 8/2005 | Sakoda et al. |
| 2005/0226273 | A1 | 10/2005 | Qian |
| 2005/0237992 | A1* | 10/2005 | Mishra et al. ............... 370/349 |
| 2005/0238016 | A1* | 10/2005 | Nishibayashi ........ H04L 1/1614 370/389 |
| 2006/0056443 | A1 | 3/2006 | Tao et al. |
| 2006/0092871 | A1 | 5/2006 | Nishibayashi et al. |
| 2007/0058605 | A1 | 3/2007 | Meylan et al. |
| 2007/0115180 | A1 | 5/2007 | Kish et al. |
| 2007/0147284 | A1 | 6/2007 | Sammour et al. |
| 2007/0153760 | A1* | 7/2007 | Shapira ................ H04B 7/2681 370/350 |
| 2007/0165590 | A1 | 7/2007 | Kneckt et al. |
| 2007/0298742 | A1 | 12/2007 | Ketchum et al. |
| 2008/0002615 | A1 | 1/2008 | Nakajima et al. |
| 2008/0075004 | A1 | 3/2008 | Mishima |
| 2008/0285523 | A1 | 11/2008 | Bjorken |
| 2009/0181687 | A1* | 7/2009 | Tiirola et al. ................ 455/450 |
| 2009/0203323 | A1* | 8/2009 | Ratasuk et al. ............... 455/68 |
| 2009/0213767 | A1* | 8/2009 | Trainin .................. G01V 1/303 370/278 |
| 2009/0225700 | A1* | 9/2009 | Shen et al. ..................... 370/328 |
| 2009/0252100 | A1 | 10/2009 | Sridhara et al. |
| 2009/0252110 | A1 | 10/2009 | Sridhara et al. |
| 2009/0252143 | A1 | 10/2009 | Sridhara et al. |
| 2010/0189056 | A1* | 7/2010 | Nishibayashi ........ H04L 1/1671 370/329 |

FOREIGN PATENT DOCUMENTS

| | | |
|---|---|---|
| CN | 1747474 A | 3/2006 |
| CN | 1826762 A | 8/2006 |
| CN | 1853377 A | 10/2006 |
| CN | 101268660 A | 9/2008 |
| CN | 101292447 A | 10/2008 |
| CN | 101297561 A | 10/2008 |
| DE | 2006014492 | 2/2007 |
| EP | 1589704 A2 | 10/2005 |
| EP | 1641180 A1 | 3/2006 |
| EP | 1641180 A1 | 3/2006 |
| EP | 1777878 A1 | 4/2007 |
| EP | 1777878 A1 | 4/2007 |
| JP | 2005039728 A | 2/2005 |
| JP | 2005252897 A | 9/2005 |
| JP | 2005348388 A | 12/2005 |
| JP | 2006050519 A | 2/2006 |
| JP | 2006129393 A | 5/2006 |
| JP | 2007525092 A | 8/2007 |
| JP | 2009509469 A | 3/2009 |
| WO | 2005004500 A2 | 1/2005 |
| WO | WO-2006008638 A1 | 1/2006 |
| WO | 2006091809 | 8/2006 |
| WO | WO06091809 | 8/2006 |
| WO | WO-06096753 A2 | 9/2006 |
| WO | 2007038118 A2 | 4/2007 |
| WO | 2007046618 A1 | 4/2007 |
| WO | WO-2007087842 A1 | 8/2007 |
| WO | 2008114662 A1 | 9/2008 |

OTHER PUBLICATIONS

Coffey. S., et al., "WWISE IEEE 802.11n Proposal," doc.: IEEE 802.11-04/0935r3, Sep. 2004, pp. 1-60.
Fischer. M., "WWISE MAC Proposal for TGn," doc.: IEEE 802.11-05/0016r2, Jan. 17, 2005, pp. 1-56.
International Preliminary Report on Patentability—PCT/US2010/022611, The International Bureau of WIPO—Geneva, Switzerland, Feb. 25, 2011.
International Search Report & Written Opinion—PCT/US2009/037495, International Search Authority—European Patent Office—dated Jun. 25, 2009.
International Search Report & Written Opinion—PCT/US2009/039427, International Search Authority—European Patent Office—dated Oct. 15, 2009.
International Search Report and Written Opinion—PCT/US10/022611, International Search Authority—European Patent Office, dated May 7, 2010.
Taiwan Search Report—TW098108786—TIPO—dated Jul. 16, 2012.
Taiwan Search Report—TW098109744—TIPO—dated May 25, 2012.
European Search Report—EP13020054—Search Authority—Munich—dated Oct. 28, 2013.
Jang K. et al., "Samsung MAC Proposal Technical Specifications", IEEE, IEEE, Piscataway, NJ, USA, vol. IEEE P802.11 Wireless LANs, Aug. 30, 2004 (Aug. 30, 2004), pp. 1-33, XP040384653.
Kim S et al., "MCCA: A High-Throughput MAC Strategy for Next-Generation WLANs [Medium Access Control Protocols for Wireless Lans]", IEEE Wireless Communications, 20080201 IEEE Service Center, Piscataway, NJ, US, 2008, vol. 15, pp. 32-39, XP011204550, ISSN: 1536-1284.
Bansal A., et al., "Lb84 Cid 7366 Text Proposal", IEEE, 802.11-06/1054r1, 2006-9, pp. 1-3, URL, https://mentor.ieee.org/802.11/dcn/06/11-06-1054-01-000n-1b84-cid-7366-text-proposal.doc.
Mujtaba S.A., "TGn Sync Proposal Technical Specification", IEEE 802.11-04/889r0, 2004-8, pp. 13-15, 19-21, URL, https://mentor.ieee.org/802.11/dcn/04/11-04-0889-00-000n-tgnsync-proposal-technical-specification.doc.

* cited by examiner

METHODS AND APPARATUS FOR REVERSE LINK ACKNOWLEDGEMENT IN A WIRELESS LOCAL AREA NETWORK (WLAN)

CLAIM OF PRIORITY UNDER 35 U.S.C. § 119

The present Application for Patent claims priority to Provisional Application No. 61/041,670 entitled "METHOD AND APPARATUS FOR ACKNOWLEDGMENT IN A WIRELESS LOCAL AREA NETWORK (WLAN)" filed Apr. 2, 2008, and Provisional Application No. 61/090,419 entitled "METHODS AND APPARATUS FOR REVERSE LINK DATA AND ACKNOWLEDGEMENT AND IN A WIRELESS LOCAL AREA NETWORK (WLAN)" filed Aug. 20, 2008, and assigned to the assignee hereof and hereby expressly incorporated by reference herein.

BACKGROUND

Field

The present application relates generally to the operation of wireless communication systems, and more particularly, to methods and apparatus for reverse link acknowledgment in a communication network Background One of the main features of wireless systems like an IEEE 802.11 WLAN is the acknowledgement of successfully received packets. Successfully received packets are those, for example, that did not collide with other transmissions or they have reception power above the receiver sensitivity threshold so that they are able to be properly decoded at the receiver. In an 802.11 system, the MAC layer protocol data unit (MPDU) that comprises upper layer (i.e., IP layer, etc.) data is encompassed in the PLCP (Physical layer convergence procedure) layer protocol data unit (PPDU). The MPDU has a 32-bit CRC error detection mechanism that spans the data as well as the MAC header. Upon error free reception (no error in the CRC frame check), an acknowledgement (ACK) is sent by the receiver to the transmitter. The ACK is sent by the receiver after a Short Interframe Space (SIFS) time so that there is enough time to decode the packet to check if the frame was intended for the decoding station, and to check for the presence of errors by computing the Cyclic Redundancy Check (CRC). IEEE 802.11e/n introduces a Block ACK where a receiving station acknowledges reception of multiple frames by transmitting a single acknowledgement frame with a bitmap of the successfully received MPDUs. ACKs can increase the Quality of Service (QoS) for users in the WLAN. However, in return, ACKs may increase signaling overhead and lower the overall system efficiency. With the increasing popularity of wireless networks, there is an ever greater need to increase the throughput from the existing bandwidth allocations to increase system efficiency. Due to bandwidth limitations, the efficiency of these networks needs to be enhanced to provide higher throughputs.

Therefore, there is a need in the art to provide solutions to the above identified problems. The various aspects disclosed herein are directed to methods and an apparatus for increasing the efficiency of a WLAN that utilizes acknowledgements.

SUMMARY

In various aspects, a reverse link acknowledgment system comprising methods and apparatus is provided that operates to increase the efficiency of a WLAN. In an aspect, the system provides an enhanced acknowledgement mechanism to increase the efficiency at which data transmitted over a common channel to a plurality of devices is acknowledged over a reverse link.

In an aspect, a method is provided for communication using a channel that is common to a plurality of nodes. The method comprises receiving, at a first node of the plurality of nodes, a data communication over the common channel, the data communication being decodable by other nodes of the plurality of nodes. The method also comprises determining transmission resources from the data communication, wherein the transmission resources are different for each node, and transmitting a response over the common channel using the determined transmission resources.

In an aspect, an apparatus is provided for communication using a channel that is common to a plurality of nodes and the apparatus. The apparatus comprises a receiver configured to receive a data communication over the common channel, the data communication being decodable by the plurality of nodes. The apparatus also comprises a controller configured to determine transmission resources from the data communication, wherein the transmission resources are different for each of the nodes and the apparatus, and a transmitter configured to transmit a response over the common channel using the determined transmission resources.

In an aspect, an apparatus is provided for communication using a channel that is common to a plurality of nodes and the apparatus. The apparatus comprises means for receiving a data communication over the common channel, the data communication being decodable by the plurality of nodes. The apparatus also comprises means for determining transmission resources from the data communication, wherein the transmission resources are different for each of the nodes and the apparatus, and means for transmitting a response over the common channel using the determined transmission resources.

In an aspect, a method is provided for communication using a channel that is common to a plurality of nodes. The method comprises transmitting to the plurality of nodes a data communication over the common channel, and receiving responses from the plurality of nodes, wherein each response was sent using different transmission resources determined from the data communication.

In an aspect, an apparatus is provided for communication using a channel that is common to a plurality of nodes and the apparatus. The apparatus comprises a transmitter configured to transmit to the plurality of nodes a data communication over the common channel, and a receiver configured to receive responses from the plurality of nodes, wherein each response was sent using different transmission resources determined from the data communication.

In an aspect, an apparatus is provided for communication using a channel that is common to a plurality of nodes and the apparatus. The apparatus comprises means for transmitting to the plurality of nodes a data communication over the common channel, and means for receiving responses from the plurality of nodes, wherein each response was sent using different transmission resources determined from the data communication.

Other aspects will become apparent after review of the hereinafter set forth Brief Description of the Drawings, Description, and the Claims.

DESCRIPTION

Various aspects of the invention are described below. It should be apparent that the teachings herein may be embodied in a wide variety of forms and that any specific structure, function, or both being disclosed herein are merely representative. Based on the teachings herein one skilled in the art should appreciate that any aspect of the invention disclosed herein may be implemented independently of any other aspects and that multiple aspects of the invention may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. An aspect may comprise one or more elements of a claim.

Figure 1:
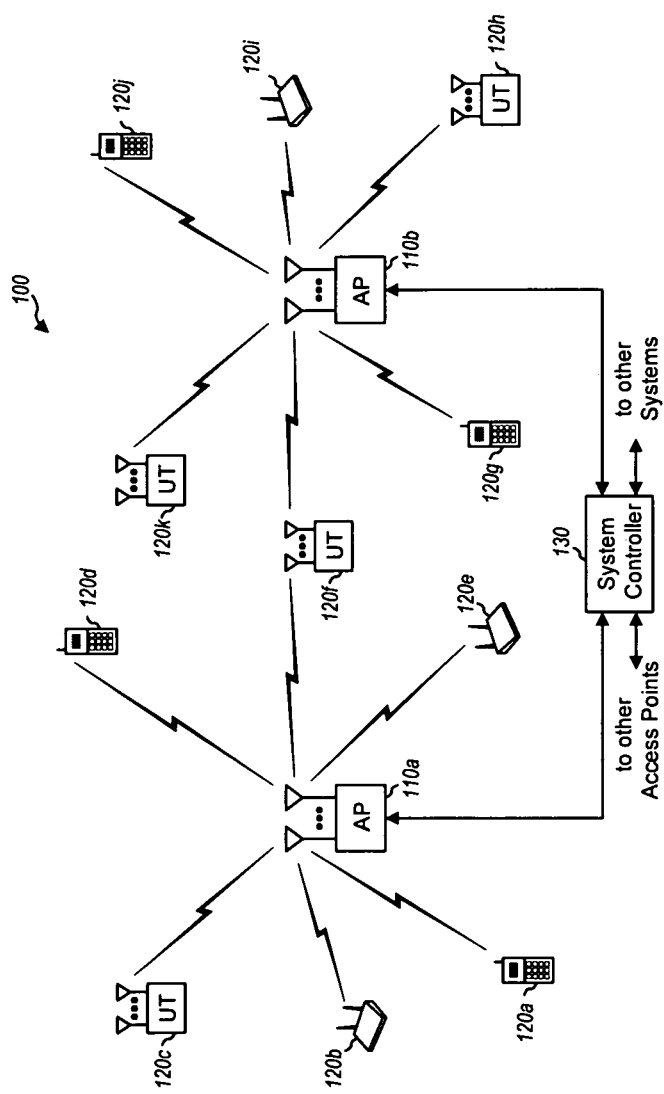
FIG. 1 shows a MIMO WLAN system that supports a number of users and is capable of implementing various aspects of a reverse link acknowledgment system.

FIG. 1 shows a MIMO WLAN system 100 that supports a number of users and is capable of implementing various aspects of a reverse link acknowledgment system. The described aspects can be used with various WLAN systems and are not limited to use with the MIMO WLAN system 100, which is shown and described for exemplary purposes.

The MIMO WLAN system 100 includes a number of access points (APs) 110 that support communication for a number of user terminals (UTs) 120. For example, in various aspects, an access point may comprise, be implemented as, or known as NodeB, Radio Network Controller (RNC), eNodeB, Base Station Controller (BSC), Base Transceiver Station (BTS), Base Station (BS), Transceiver Function (TF), Radio Router, Radio Transceiver, Basic Service Set (BSS), Extended Service Set (ESS), Radio Base Station (RBS), or some other terminology. Furthermore, in various aspects, a user terminal may comprise, be implemented as, or known as an access terminal (AT), a subscriber station, a subscriber unit, a mobile station, a remote station, a remote terminal, a user terminal, a user agent, a user device, user equipment (UE), or some other terminology. In some implementations an access terminal may comprise a cellular telephone, a cordless telephone, a Session Initiation Protocol (SIP) phone, a wireless local loop (WLL) station, a personal digital assistant (PDA), a handheld device having wireless connection capability, or some other suitable processing device connected to a wireless modem.

Accordingly, one or more aspects taught herein may be incorporated into a phone (e.g., a cellular phone or smart phone), a computer (e.g., a laptop), a portable communication device, a portable computing device (e.g., a personal data assistant), an entertainment device (e.g., a music or video device, or a satellite radio), a global positioning system device, or any other suitable device that is configured to communicate via a wireless or wired medium.

For simplicity, only two access points 110a and 110b are shown in FIG. 1. User terminals 120a-k may be dispersed throughout the system. Each user terminal may be a fixed or mobile terminal that can communicate with the access point. Each user terminal may communicate with one or possibly multiple access points on the downlink and/or uplink at any given moment. The downlink (i.e., forward link) refers to transmission from the access points to the user terminals, and the uplink (i.e., reverse link) refers to transmission from the user terminals to the access points.

The access point 110a communicates with user terminals 120a through 120f and access point 110b communicates with user terminals 120f through 120k. Depending on the specific design of system 100, an access point may communicate with multiple user terminals simultaneously (e.g., via multiple code channels or sub-bands) or sequentially (e.g., via multiple time slots). At any given moment, a user terminal may receive downlink transmissions from one or multiple access points. The downlink transmission from each access point may include overhead data intended to be received by multiple user terminals, user-specific data intended to be received by specific user terminals, other types of data, or any combination thereof. The overhead data may include pilot, page and broadcast messages, system parameters, and so on.

The MIMO WLAN system 100 is based on a network architecture having a centralized controller. Thus, a system controller 130 couples to access points 110a-b and may further couple to other systems and networks. For example, system controller 130 may couple to a packet data network (PDN), a wired local area network (LAN), a wide area network (WAN), the Internet, a public switched telephone network (PSTN), a cellular communication network, and so on. System controller 130 may be designed to perform a number of functions such as (1) coordination and control for the access points coupled to it, (2) routing of data among these access points, (3) access and control of communication with the user terminals served by these access points, and so on.

During operation of the system 100, the access point 110a communicates with the user terminals 120a-120f. In this example, access point 110a acts as the transmitter station and has packets queued for transmission to the receiving user terminals 120a-120f. Let access point 110a be called station 100 (STA-100) and user terminals 120a-120f be called stations 101 through 106 (STA-101 to STA-106) respectively. The following description describes transmissions and acknowledgements in accordance with various aspects of a reverse link acknowledgment system.

Figure 2:
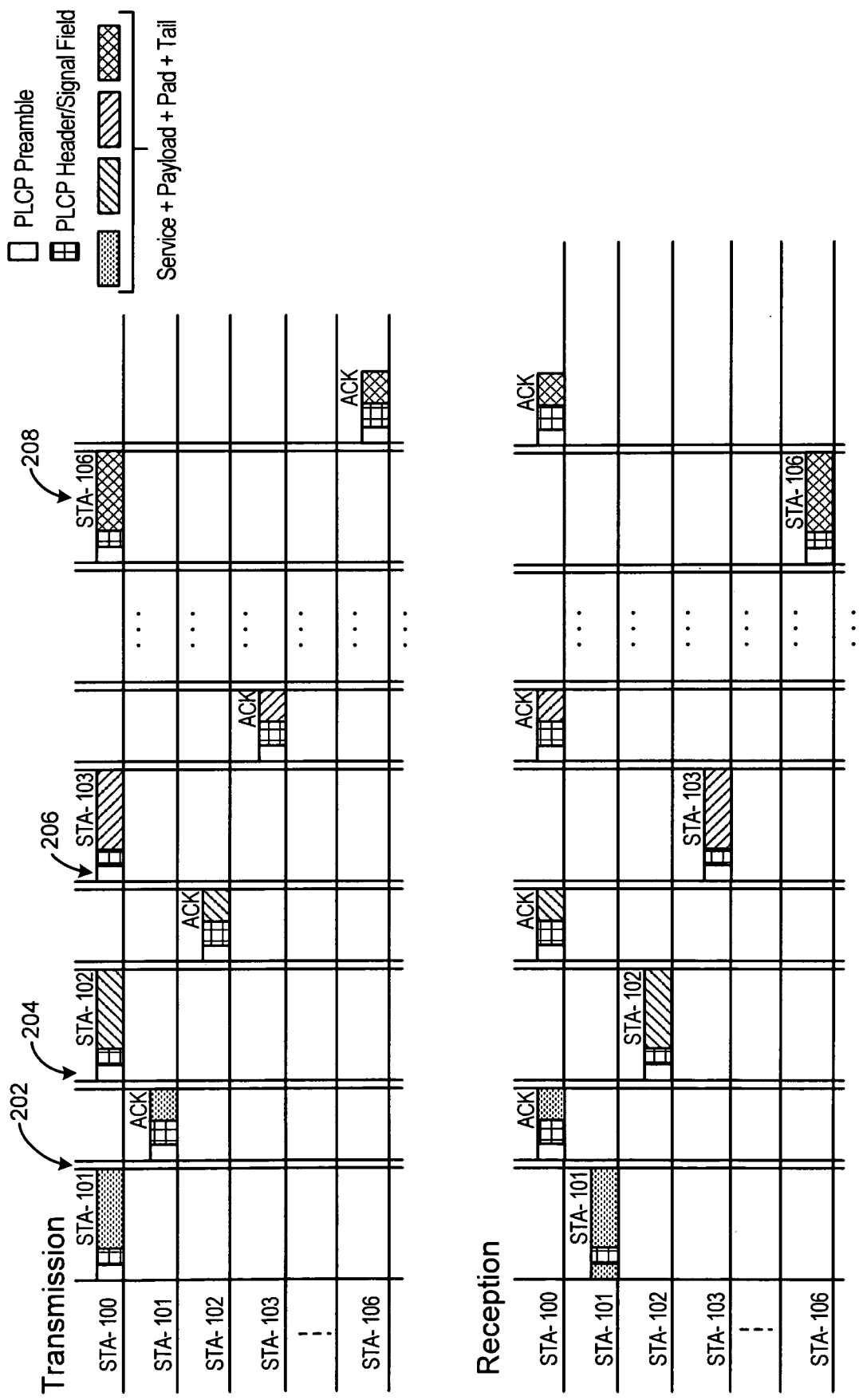
FIG. 2 shows a diagram illustrating the operation of the system shown in FIG. 1 to perform a transmission and reception exchange in accordance with IEEE 802.11 protocols.

FIG. 2 illustrates the operation of the system 100 to perform a transmission and reception exchange in accordance with an IEEE 802.11 protocols. A transmission and reception exchange between transmitting station STA-100 and receiving stations STA-101 through STA-106 is illustrated.

The STA-100 transmits a packet and expects an ACK in return. Upon receiving the packet from STA-100 without any errors, STA-101 sends an ACK after a SIFS time duration 202. This process is repeated for all the stations (STAs) assuming there was no error in packet reception. If there was an error in reception, then there may be retransmissions from STA-100 after an ACK timeout period.

Moreover, for each of the frames that are transmitted over-the-air (OTA), a PLCP preamble 204 is added for synchronization with the receiver (AGC, time, frequency) and a PLCP header 206 is added (indicating length, rate and other information). Additionally, a service field (for descrambling by receiver), pad bits (for forward error correction decoding), and tail bits are added to the payload 208 at the physical layer. This amounts to additional overhead reducing the overall throughput of the network.

In addition to the overhead introduced by the header information, the channel is idle due to the SIFS time between each transmission (from transmitter and receiver) in this process. Thus, the channel is idle for a total time duration of 12*SIFS. This transmission process is associated with IEEE 802.11 WLAN systems having ten receivers and a single transmitter at any instant. This reduces the overall efficiency of the network.

The SIFS time duration between the reception of the PPDU and transmission of the ACK introduces delay and reduces the throughput of the transmitting station since it has to wait for the reception of the ACK before transmitting the next packet during a Transmission Opportunity (TXOP) duration. This reduction in throughput or inefficiency is further exacerbated as the physical data rates go up because the fixed SIFS time duration becomes a greater percentage of the total transmission time.

One way to reduce the overhead introduced by the physical layer header can be to aggregate the packets at the physical layer. This method reduces the overhead at the physical layer by transmitting a single preamble for all the PPDUs packed into a single aggregated packet (APPDU). In response to the transmission of an APPDU, the STA-100 can expect to receive a Block ACK (BA), for example, by setting an ACK policy field in a transmitted header to implicit Block ACK.

Figure 3:
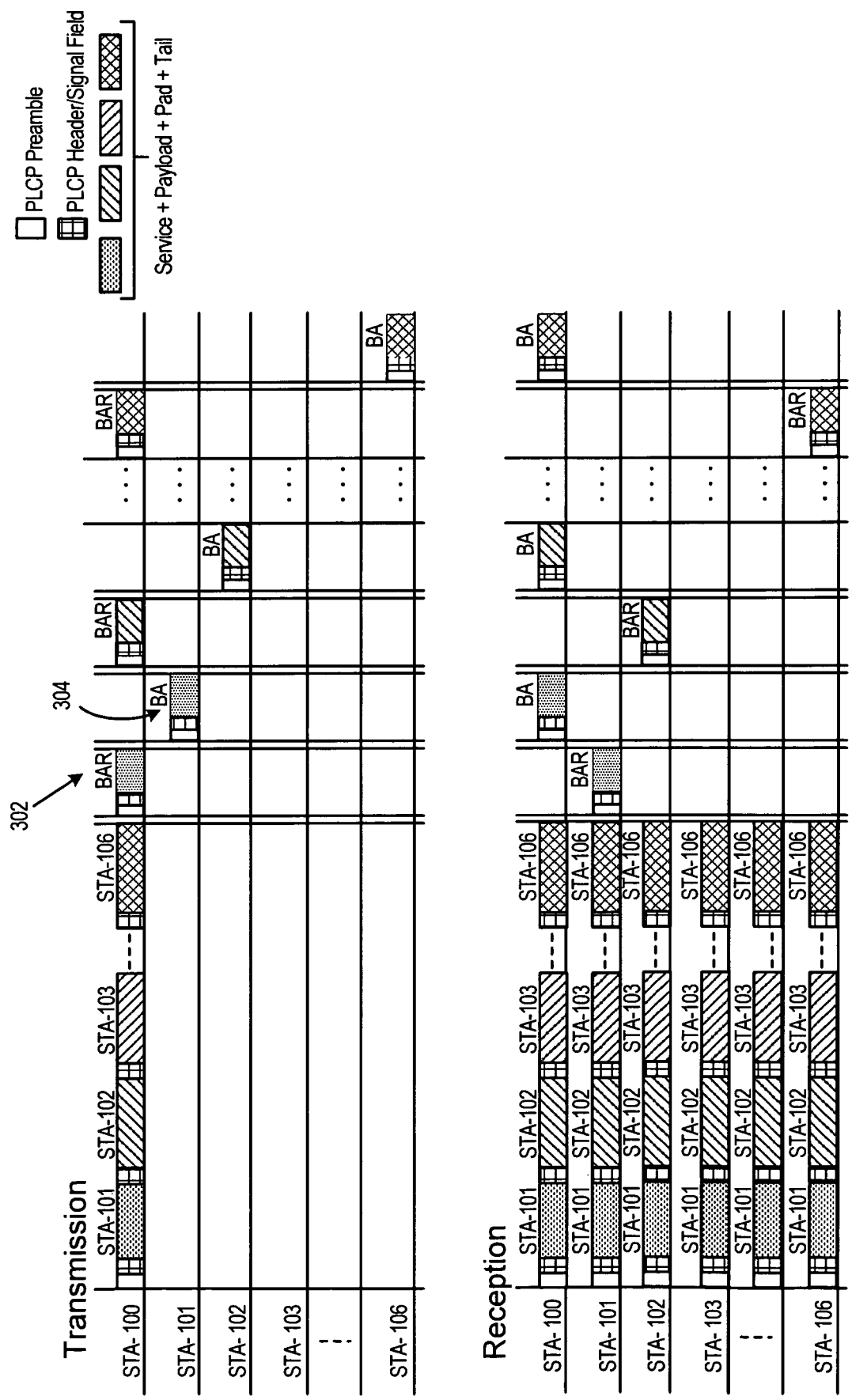
FIG. 3 shows a diagram illustrating the operation of the network shown in FIG. 1 to perform an APPDU transmission and reception exchange in accordance with IEEE 802.11 protocols.

FIG. 3 illustrates the operation of the system 100 to perform an APPDU transmission and reception exchange in accordance with IEEE 802.11 protocols. In an aspect, the STA-100 transmits an APPDU to receiving stations STA-101 through STA-106. Upon completion of the APPDU transmission, the transmitter STA-100 waits for a SIFS time duration and sends a Block ACK request (BAR) 302 to STA-101. STA-101 waits for a SIFS time duration and sends a Block ACK 304 back to STA-100 indicating the successful reception of the PPDU in the APPDU intended for STA-101. The steps are repeated for all the receiving stations STA-101 through STA-106. This method reduces the total transmission time of STA-100 by eliminating the need for a preamble for each of the PPDUs. Also, a SIFS time duration between the individual packet transmissions from the transmitting station STA-100 is not required. One disadvantage of this technique is that the STA-100 has to send the BAR to each of the receiving stations STA-101 through STA-106. Each of the BAR transmissions is typically 24-bytes in length with an additional physical layer overhead of PLCP [Preamble+Header], Service, and Tail+Pad. Also the BAR and the BA frames are separated by a SIFS time duration, thereby introducing an additional 12*SIFS time duration to the entire transaction. This transmission process is associated with IEEE 802.11n systems having six receivers and a single transmitter at any instant.

Figure 4:
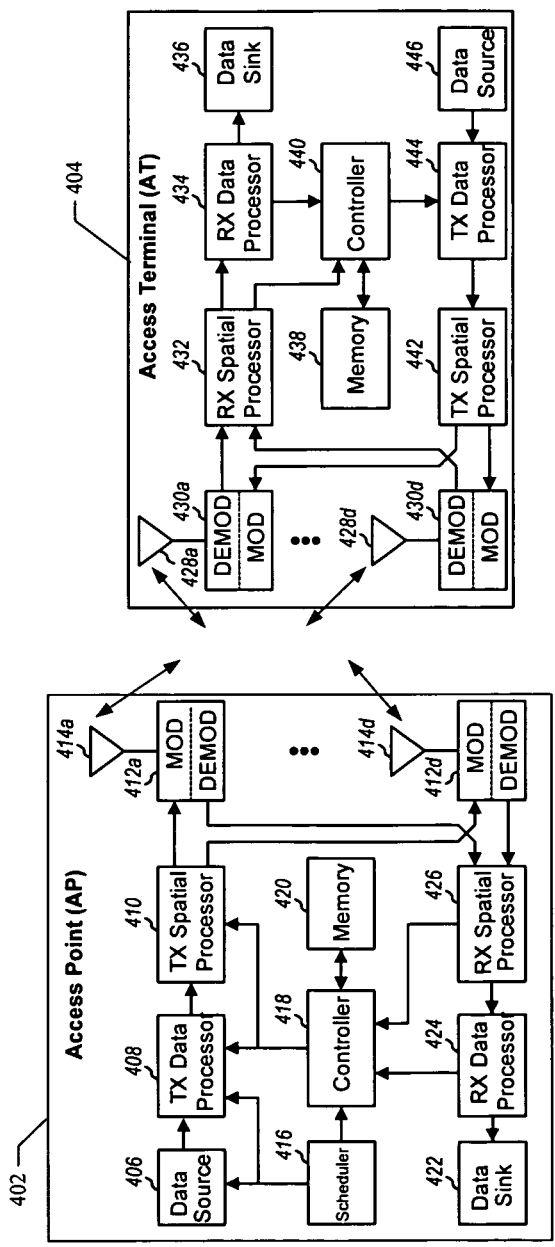
FIG. 4 shows a diagram illustrating aspects of an access point and a terminal that are configured to operate in accordance with aspects of a reverse link acknowledgement system.

FIG. 4 shows a diagram illustrating aspects of an access point 402 and access terminal 404 that are configured to operate in accordance with aspects of a reverse link acknowledgement system. For example, the access point 402 is suitable for use as the access point 110*x* shown in FIG. 1, and the access terminal 404 is suitable for use as the terminal 120*y* also shown in FIG. 1.

Processing by the access point 402 and the terminal 404 for downlink and uplink communications is described in further detail below. In various aspects, the processing for the uplink may be the same, different, or complementary to the processing for the downlink.

With respect to downlink processing at access point 402, a transmit (TX) data processor 408 receives traffic data (i.e., information bits) from a data source 406 and signaling and other information from a controller 418 and possibly a scheduler 416. The controller is operable to access memory 420. These various types of data may be sent on different transport channels. The TX data processor 410 "frames" the data (if necessary), scrambles the framed/unframed data, encodes the scrambled data, interleaves (i.e., reorders) the coded data, and maps the interleaved data into modulation symbols. For simplicity, a "data symbol" refers to a modulation symbol for traffic data, and a "pilot symbol" refers to a modulation symbol for pilot. The scrambling randomizes the data bits. The encoding increases the reliability of the data transmission. The interleaving provides time, frequency, and/or spatial diversity for the code bits. The scrambling, coding, and modulation may be performed based on control signals provided by controller 418 and are described in further detail below. The TX data processor 408 provides a stream of modulation symbols for each spatial channel used for data transmission.

A TX spatial processor 410 receives one or more modulation symbol streams from TX data processor 408 and performs spatial processing on the modulation symbols to provide four streams of transmit symbols to modulators/demodulators 412*a-d*, one stream for each transmit antenna 414*a-d*. The spatial processing is described in further detail below. The TX data processor 408 and controller 418 can aggregate the data units and perform the layering necessary to accommodate the WLAN protocols. For example, the TX data processor 408 and controller 418 are operable to generate PPDUs and APPDUs as described above.

Each modulator/demodulator (MODEM) 422*a-d* receives and processes a respective transmit symbol stream to provide a corresponding stream of OFDM symbols. Each OFDM symbol stream is further processed to provide a corresponding downlink modulated signal. The four downlink modulated signals from the modulator/demodulator 412*a* through 412*d* are then transmitted from the four antennas 414*a* through 414*d*, respectively.

With respect to downlink processing at the terminal 404, one or multiple receiving antennas 428*a-d* receive the transmitted downlink modulated signals, and each receive antenna provides a received signal to a respective demodulator/modulator 430*a-d*. Each demodulator 430*a-d* performs processing complementary to that performed at modulator 412 and provides received symbols. A receive (RX) spatial processor 432 then performs spatial processing on the received symbols from all demodulators 430 to provide recovered symbols, which are estimates of the modulation symbols sent by the access point 402. The recovered symbols are provided to the RX data processor 434.

An RX data processor 434 receives and de-multiplexes the recovered symbols into their respective transport channels. The recovered symbols for each transport channel may be symbol de-mapped, de-interleaved, decoded, and descrambled to provide decoded data for that transport channel. The decoded data for each transport channel may include recovered packet data, messages, signaling, and so on, which are provided to a data sink 436 for storage and/or a controller 440 for further processing. The controller 440 is operable to access memory 438. The received data can also be the various PPDUs and APPDUs as described above.

Also with respect to the downlink, at each active user terminal, such as terminal 404, the RX spatial processor 432 further estimates the downlink to obtain channel state information (CSI). The CSI may include channel response estimates, received SNRs, and so on. The RX data processor 434 may also provide the status of each packet/frame that is received on the downlink. The controller 440 receives the channel state information and the packet/frame status and determines the feedback information to be sent back to the access point 402. The feedback information comprises ACKs and BAs as described above.

With respect to the uplink processing at the terminal 404, the feedback information is processed by a TX data processor 444 and a TX spatial processor 442 (if present), conditioned by one or more modulators 430a-d, and transmitted via one or more antennas 428a-d back to the access point 402. Note that data may also be provided to the TX data processor from data source 446.

With respect to uplink processing at the access point 402, the transmitted uplink signal(s) are received by antennas 414a-d, demodulated by de-modulators 412a-d, and processed by an RX spatial processor 426 and an RX data processor 424 in a complementary manner to that performed at the user terminal 404. Information from the RX data processor is provided to a data sink 422. The feedback that is received comprises the various ACKs and BAs as described above. The recovered feedback information is then provided to the controller 418 and the scheduler 416.

The scheduler 416 uses the feedback information to perform a number of functions such as (1) selecting a set of user terminals for data transmission on the downlink and uplink, (2) selecting the transmission rate(s) and the transmission mode for each selected user terminal, and (3) assigning the available FCH/RCH resources to the selected terminals. The scheduler 416 and/or controller 418 further use information (e.g., steering vectors) obtained from the uplink transmission for the processing of the downlink transmission.

In various aspects, a number of transmission modes are supported for data transmission on the downlink and uplink. For example, the access point 402 and terminal 404 are configured to provide transmission modes comprising space division, frequency division, time division, data rate division, and code division transmission modes.

Figure 5:
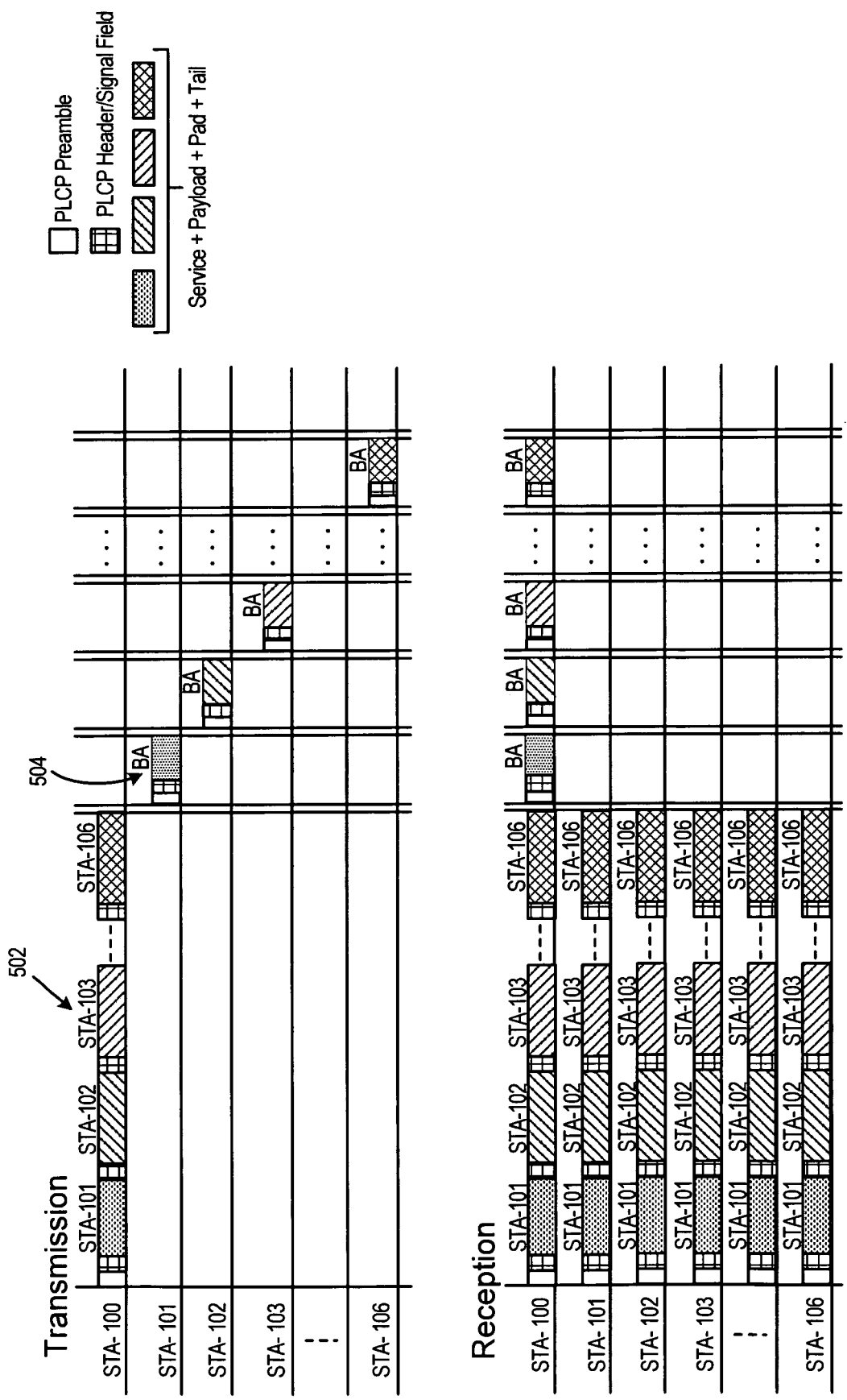
FIG. 5 shows a diagram illustrating an APPDU transmission and reception exchange in accordance with aspects of a reverse link acknowledgement system.

FIG. 5 shows a diagram 500 that illustrates an APPDU transmission and reception exchange in accordance with aspects of a reverse link acknowledgement system. For example, the transmission and reception exchange can be performed by the access point 402 and terminal 404 shown in FIG. 4. The diagram 500 demonstrate how the various aspects operate to increase efficiency in a WLAN that utilizes block ACKs.

As shown above, the APPDU operational performance is limited by the use of BAR which adds an overhead of 24-bytes for a BAR frame and the corresponding SIFS duration time between the BAR from the transmitting station and the BA from the acknowledging station. As illustrated in FIG. 5, aspects of the reverse link acknowledgement system utilize a scheduled block acknowledge (BAS) in order to reduce the need for transmitting multiple BARs.

In FIG. 5, STA-100 transmits an APPDU 502 packed with PPDUs for receiving stations STA-101 through STA-106. An APPDU consists of multiple PPDUs destined for different stations. Each PPDU within the APPDU can contain a MPDU or an AMPDU. Upon completion of the APPDU transmission, each receiving station STA-101 through STA-106 sends a BA 504 at their respective BAS time. The BAS can be determined at each station using one of the methods discussed below.

This operation eliminates the need for the BAR frames when the ACK policy field is set to immediate Block ACK and also eliminates the corresponding SIFS time duration for each of the BAR frames sent. Hence, this operation conserves transmission of 6 BAR frames and corresponding 6*SIFS time duration for the scenario shown in FIG. 5. This operation thereby improves the overall efficiency resulting in an enhanced data throughput. This operation is suitable for use with on other WLAN systems. Therefore, individual requests for acknowledgements for each station are no longer required to be transmitted by the transmitting station, because the original transmitted aggregated data contains an implied ACK schedule for the receivers.

Block ACK Scheduling (BAS)

In an aspect, inherent information determined from the APPDU received by each of the receivers can be used at each receiver to determine a BAS schedule to determine when an ACK/BA is to be transmitted. For example, the knowledge of the total frame length of the APPDU and position of each individual PPDUs for different destinations is contained in the transmitted APPDU. The receivers can exploit this knowledge. Each PPDU intended for a different receiving station has PLCP Header information that comprises length and the rate information. This part of the PPDU is generally transmitted at a lower rate than that of the data frame. This part of the frame is usually transmitted at the same data rate and modulation scheme as that of the preamble. Hence, this information can be decoded by all the stations in the list of receiving stations in the APPDU frame. Thus, each individual station can estimate the duration of each PPDU (even if it is not intended for itself).

To determine when to transmit an ACK/BA, the stations can count the number of PLCP Headers seen and the position of the PPDU intended for them. Once the reception of PPDU frame is complete, the station that received the first PPDU in the APPDU aggregate waits for a SIFS time duration and transmits its BA frame to the APPDU transmitter. The length of BA frame is fixed and hence all stations can estimate the time required to transmit a BA. After waiting for the estimated transmission duration of a BA plus SIFS time duration, the station receiving the second PPDU in the APPDU transmits its BA. This process is repeated by all the stations that were recipients of the APPDU.

In another aspect, the transmitter embeds a schedule for the receivers in the transmitted APPDU. For example, the transmitter of an APPDU can append a Block ACK schedule for each of the APPDU recipients in their MAC header. The transmitter of the APPDU has knowledge of the length of each PPDU and the length of each MPDU if the PPDU carries an AMPDU. Thus, the Block ACK schedule computation for each of the PPDU recipients of the APPDU is straight forward. A 16-bit BAS field can account for 65 milliseconds of delay, which is more than sufficient since the typical TxOP duration is of the order of a few milliseconds. The ACK policy field of each MPDU in the individual PPDUs packed in the APPDU is set to immediate Block ACK. It should be noted that a delayed BA could also be used. But the APPDU transmitter will have to account for this and schedule the BA transmission by the APPDU receivers accordingly. Upon the successful reception of the PPDU, each station schedules its BA at the appropriate BAS time. If a station was unable to decode the complete PPDU, it does not send its BA and hence the scheduled time for this BA goes as unutilized air time without affecting the protocol operation.

In still another aspect, the time duration between BA transmissions from different receiving stations can be further reduced to a value less than that of the SIFS time duration, further improving the overall efficiency.

Figure 6:
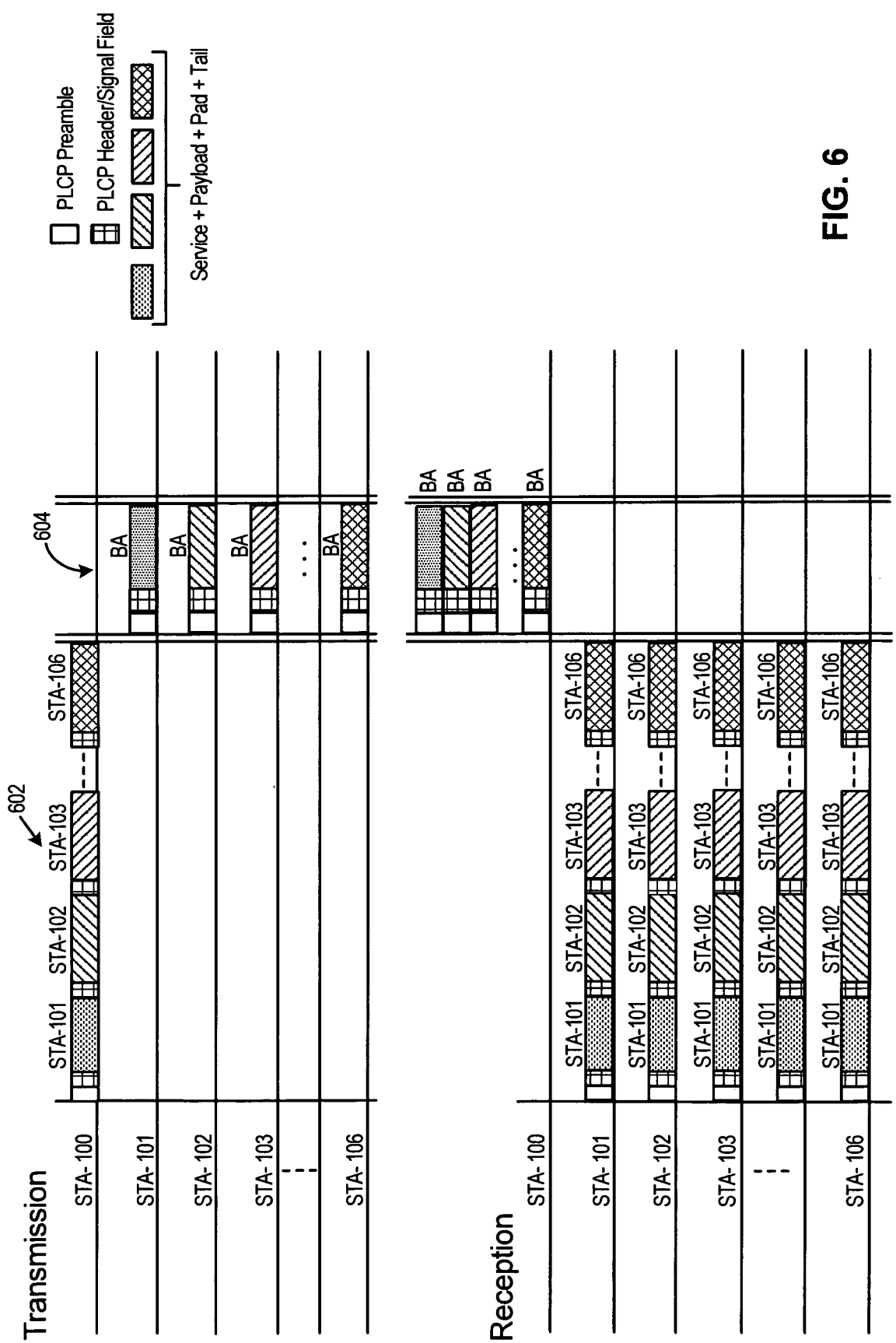
FIG. 6 shows a diagram that illustrates a frequency division transmission and reception exchange in accordance with aspects of a reverse link acknowledgement system.

FIG. 6 shows a diagram that illustrates a frequency division transmission and reception exchange in accordance with aspects of a reverse link acknowledgement system. For example, increased efficiency of APPDU transmissions can be achieved in orthogonal frequency division multiple access (OFDMA) systems. In an aspect, the transmission and reception exchange can be performed by the access point 402 and terminal 404 shown in FIG. 4.

In an aspect, the ACK policy field of the individual PPDUs in the APPDU can be set to implicit OFDMA Block ACK (OBA). The OFDMA tone assignment for each of the APPDU receivers is calculated by the transmitting station STA-100 and tagged along with the APPDU frame. Upon receiving the APPDU with the OFDMA tone assignment information, individual receiving stations STA-101 through STA-106 transmit their OFDMA BA after a SIFS time duration. It should be noted that the guard interval may be increased (e.g. doubled) for the successful reception of the OFDMA BAs from the APPDU receiving stations. This increase in the guard interval maybe necessary to accommodate a large spread in the round trip times between STA-101 through STA-106.

Referring now to FIG. 6, station STA-100 transmits an APPDU 602 for the stations STA-101 through STA-106 with the OFDMA tone assignment information embedded in each individual PPDUs. Upon the completion of the APPDU reception, the receiving stations, STA-101 through STA-106, transmit an OFDMA BA 604 using their respective tone assignment to STA-100. It can be clearly seen that the SIFS overhead time now is reduced to a single SIFS time duration that is between the reception of APPDU and transmission of OFDMA BA. Thus, eliminating SIFS using OFDMA BA will lead to even higher efficiency improvement gains when the physical data rate is increased (e.g. via more bandwidth, more antennas, SDMA, etc). For example, acknowledgments can be received at the same time by a transmitting station but on different frequencies, etc. and thus one result is acknowledgment time will be reduced while minimizing interference.

In another aspect, the station STA-100 transmits an APPDU 602 for the stations STA-101 through STA-106. The receiving stations STA-101 through STA-106 exploit the inherent information in the APPDU as described above to generate their own tone assignments in order to transmit their OFDMA BA 604. This can be accomplished in various ways. For example, the knowledge of the total frame length of the APPDU and position of each individual PPDUs for different destinations is contained in the transmitted APPDU. The receivers operate to execute an algorithm that takes this inherent information and calculates a tone assignment.

Figures 7, 8:
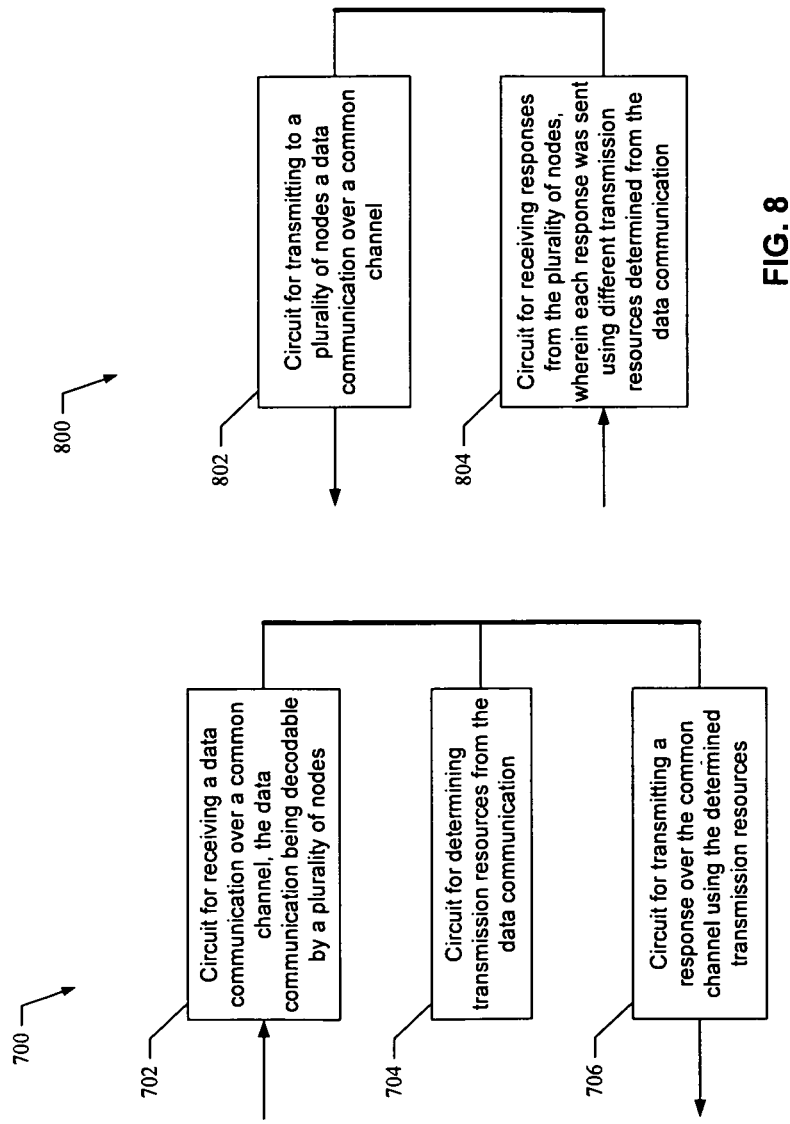
FIG. 7 shows an exemplary access terminal for use in aspects of a reverse link acknowledgment system.
FIG. 8 shows an exemplary access point for use in aspects of a reverse link acknowledgment system.

FIG. 7 shows an exemplary access terminal 700 for use in aspects of a reverse link acknowledgment system. For example, the terminal 700 provides communications using a channel that is common to a plurality of nodes and the terminal 700. In an aspect, the terminal 700 comprises one or more circuits configured to provide aspects of a reverse link acknowledgment system as described herein.

The terminal 700 comprises a first circuit 702 for receiving a data communication over a common channel, the data communication being decodable by the plurality of nodes. For example, in an aspect, the first circuit 702 comprises the RX spatial processor 432.

The terminal 700 comprises a second circuit 704 for determining transmission resources from the data communication, wherein the transmission resources are different for each of the nodes and the apparatus. For example, in an aspect, the second circuit 704 comprises RX data processor 434.

The terminal 700 also comprises a third circuit 706 for transmitting a response over the common channel using the determined transmission resources. For example, in an aspect, the third circuit 706 comprises the TX data processor 444.

FIG. 8 shows an exemplary access point 800 for use in aspects of a reverse link acknowledgment system. For example, the access point 800 provides communications using a channel that is common to a plurality of nodes and the access point 800. In an aspect, the access point 800 comprises one or more circuits configured to provide aspects of a reverse link acknowledgment system as described herein.

The access point 800 comprises a first circuit 802 for transmitting to a plurality of nodes a data communication over a common channel. For example, in an aspect, the first circuit 802 comprises the TX data processor 408.

The access point 800 comprises a second circuit 804 for receiving responses from the plurality of nodes, wherein each response was sent using different transmission resources determined from the data communication. For example, in an aspect, the second circuit 804 comprises the RX data processor 424.

In various aspects, the system comprises a computer program product having one or more program instructions ("instructions") or sets of "codes" stored or embodied on a computer-readable medium. When the codes are executed by at least one processor, for instance, a processor at the AP 402 or the AT 404, their execution causes the processor to provide the functions of the reverse link acknowledgment system described herein. For example, the computer-readable medium comprises a floppy disk, CDROM, memory card, FLASH memory device, RAM, ROM, or any other type of memory device or computer-readable medium that interfaces to AP 402 or AT 404. The sets of codes, when executed, operate to cause the AP 402 and AT 404 to provide the various functions/operations described herein.

The teachings herein may be incorporated into (e.g., implemented within or performed by) a variety of wired or wireless apparatuses (e.g., nodes). In some aspects, a node implemented in accordance with the teachings herein may comprise an access point or an access terminal.

In some aspects the node is a wireless node. Such wireless node may provide, for example, connectivity for or to a network (e.g., a wide area network such as the Internet or a cellular network) via a wired or wireless communication link. Thus, the various illustrative logics, logical blocks, modules, and circuits described in connection with the aspects disclosed herein may be implemented or performed in an AT or AP with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the aspects disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An exemplary storage medium is coupled to the processor, such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The description of the disclosed aspects is provided to enable any person skilled in the art to make or use the invention. Various modifications to these aspects may be readily apparent to those skilled in the art, and the generic principles defined herein may be applied to other aspects, e.g., in an instant messaging service or any general wireless data communication applications, without departing from the scope of the invention. Thus, the invention is not intended to be limited to the aspects shown herein but is to be accorded the widest scope consistent with the principles and novel features disclosed herein. The word "exemplary" is used exclusively herein to mean "serving as an example, instance, or illustration." Any aspect described herein as "exemplary" is not necessarily to be construed as preferred or advantageous over other aspects.

Accordingly, while aspects of a reverse link acknowledgment system (comprising methods and apparatus) for transmission of reverse link acknowledgement in a wireless local area network have been illustrated and described herein, it will be appreciated that various changes can be made to the aspects without departing from their characteristics. Therefore, the disclosures and descriptions herein are intended to be illustrative, but not limiting, of the scope of the invention, which is set forth in the following claims.

What is claimed is:

1. A method for wireless communication, the method comprising:
   transmitting an aggregated data unit comprising a plurality of data units, each of the plurality of data units intended for a different one of a plurality of apparatuses, wherein transmitting the aggregated data unit comprises simultaneously transmitting the plurality of data units;
   transmitting a first block acknowledgement request message to a first apparatus of the plurality of apparatuses to request acknowledgment of a data unit of the plurality of data units intended for the first apparatus of the plurality of apparatuses;
   receiving a first block acknowledgment message for the aggregated data unit from the first apparatus of the plurality of apparatuses after transmitting the first block acknowledgment request message, wherein the first block acknowledgment message indicates reception of the data unit intended for the first apparatus of the plurality of apparatuses; and
   transmitting, in response to receiving the first block acknowledgment message, a second block acknowledgment request message to a second apparatus of the plurality of apparatuses to request acknowledgment of a data unit of the plurality of data units intended for the second apparatus of the plurality of apparatuses.

2. The method of claim 1, wherein the aggregated data unit comprises an indicator for an implicit block acknowledgment to trigger receiving the first block acknowledgement message from the first apparatus of the plurality of apparatuses.

3. The method of claim 1, wherein transmitting the aggregated data unit comprises transmitting the aggregated data unit during a transmission opportunity (TXOP) duration.

4. The method of claim 1, wherein the block acknowledgement message comprises a bitmap comprising a bit indicating whether the data unit was successfully received by the at least one of the plurality of apparatuses.

5. The method of claim 1, wherein each of the plurality of data units comprises a physical layer protocol data unit (PPDU).

6. An apparatus for wireless communication, the apparatus comprising:
   a transmitter configured to:
      transmit an aggregated data unit comprising a plurality of data units, each of the plurality of data units intended for a different one of a plurality of target apparatuses, wherein the transmitter is configured to simultaneously transmit the plurality of data units within the aggregated data unit; and
      transmit a first block acknowledgement request message to a first apparatus of the plurality of target apparatuses to request acknowledgment of a data unit of the plurality of data units intended for the first apparatus of the plurality of target apparatuses; and
   a receiver configured to receive a first block acknowledgment message from the first apparatus of the plurality of target apparatuses after transmitting the first block acknowledgment request message, wherein the first block acknowledgment message indicates reception of the data unit intended for the at least one of the plurality of target apparatuses, and wherein the transmitter is further configured to transmit, in response to receiving the first block acknowledgment message, a second block acknowledgment request message to a second apparatus of the plurality of target apparatuses to request acknowledgment of a data unit of the plurality of data units intended for the second apparatus of the plurality of apparatuses.

7. The apparatus of claim 6, wherein the aggregated data unit comprises an indicator for an implicit block acknowledgment to trigger receiving the first block acknowledgement message from the first apparatus of the plurality of target apparatuses.

8. The apparatus of claim 6, wherein the transmitter is configured to transmit the aggregated data unit during a transmission opportunity (TXOP) duration.

9. The apparatus of claim 6, wherein the block acknowledgement message comprises a bitmap comprising a bit indicating whether the data unit was successfully received by the at least one of the plurality of target apparatuses.

10. The apparatus of claim 6, wherein each of the plurality of data units comprises a physical layer protocol data unit (PPDU).

11. An apparatus for wireless communication, the apparatus comprising:
 means for transmitting an aggregated data unit comprising a plurality of data units, each of the plurality of data units intended for a different one of a plurality of target apparatuses, wherein the means for transmitting the aggregated data unit comprises means for simultaneously transmitting the plurality of data units;
 means for transmitting a first block acknowledgement request message to a first apparatus of the plurality of target apparatuses to request acknowledgment of a data unit of the plurality of data units intended for the first apparatus of the plurality of target apparatuses;
 means for receiving a first block acknowledgment message for the aggregated data unit from the first apparatus of the plurality of target apparatuses after transmitting the first block acknowledgment request message, wherein the first block acknowledgment message indicates reception of a data unit intended for the first apparatus of the plurality of target apparatuses; and
 transmitting, in response to receiving the first block message, a second block acknowledgment request message to a second apparatus of the plurality of apparatuses to request acknowledgment of a data unit of the plurality of data units intended for the second apparatus of the plurality of apparatuses.

12. The apparatus of claim 11, wherein the aggregated data unit comprises an indicator for an implicit block acknowledgment to trigger receiving the first block acknowledgement message from the first apparatus of the plurality of target apparatuses.

13. The apparatus of claim 11, wherein the means for transmitting the aggregated data unit comprises means for transmitting the aggregated data unit during a transmission opportunity (TXOP) duration.

14. The apparatus of claim 11, wherein the block acknowledgement message comprises a bitmap comprising a bit indicating whether the data unit was successfully received by the at least one of the plurality of target apparatuses.

15. The apparatus of claim 11, wherein each of the plurality of data units comprises a physical layer protocol data unit (PPDU).

16. A computer readable storage device encoded thereon with instructions that when executed cause an apparatus to perform a method of wireless communication, said method comprising:
 transmitting an aggregated data unit comprising a plurality of data units, each of the plurality of data units intended for a different one of a plurality of apparatuses, wherein transmitting the aggregated data unit comprises transmitting the plurality of data units simultaneously;
 transmitting a first block acknowledgement request message to a first apparatus of the plurality of apparatuses to request acknowledgment of a data unit of the plurality of data units intended for the first apparatus of the plurality of apparatuses;
 receiving a first block acknowledgment message for the aggregated data unit from the first apparatus of the plurality of apparatuses after transmitting the first block acknowledgment request message, wherein the first block acknowledgment message indicates reception of the data unit intended for the first apparatus of the plurality of apparatuses; and
 transmitting, in response to receiving the first block message, a second block acknowledgment request message to a second apparatus of the plurality of apparatuses to request acknowledgment of a data unit of the plurality of data units intended for the second apparatus of the plurality of apparatuses.

17. An access point, comprising:
 an antenna;
 a transmitter coupled to the antenna and configured to:
  transmit an aggregated data unit comprising a plurality of data units, each of the plurality of data units intended for a different one of a plurality of apparatuses, wherein the transmitter is configured to transmit the plurality of data units simultaneously; and
  transmit a first block acknowledgement request message to a first apparatus of the plurality of apparatuses to request acknowledgment of a data unit of the plurality of data units intended for the first apparatus of the plurality of apparatuses; and
 a receiver configured to receive the first block acknowledgment message for the aggregated data unit from the first apparatus of the plurality of apparatuses after transmitting the first block acknowledgment request message, wherein the first block acknowledgment message indicates reception of the data unit intended for the first apparatus of the plurality of apparatuses, and wherein the transmitter is further configured to transmit, in response to receiving the first block acknowledgment message, a second block acknowledgment request message to a second apparatus of the plurality of apparatuses to request acknowledgment of a data unit of the plurality of data units intended for the second apparatus of the plurality of apparatuses.

18. A method for wireless communication, the method comprising:
 receiving, at a first apparatus of a plurality of apparatuses, an aggregated data unit comprising a plurality of data units transmitted to the plurality of apparatuses, each of the plurality of the data units intended for a different one of the plurality of apparatuses, wherein receiving the aggregated data unit comprises simultaneously receiving the plurality of data units;
 receiving a block acknowledgement request message to request acknowledgement of a single data unit, intended for the first apparatus, of the received plurality of data units; and
 transmitting a block acknowledgment message for the aggregated data unit after receiving the block acknowledgement request message, wherein the block acknowledgment message indicates reception of the single data unit intended for the first apparatus.

19. The method of claim 18, wherein receiving the aggregated data unit comprises receiving the aggregated data unit during a transmission opportunity (TXOP) duration.

20. The method of claim 18, wherein the block acknowledgement message comprises a bitmap comprising a bit indicating whether the data unit intended for the first apparatus was successfully received.

21. The method of claim 18, wherein each of the plurality of data units comprises a physical layer protocol data unit (PPDU).

22. An apparatus for wireless communication, the apparatus comprising:
 a receiver configured to:

receive an aggregated data unit comprising a plurality of data units transmitted to a plurality of apparatuses, each of the plurality of the data units intended for a different one of the plurality of apparatuses, wherein the receiver is configured to simultaneously receive the plurality of data units;

receive a block acknowledgement request message to request acknowledgement of a single data unit, intended for the apparatus, of the received plurality of data units; and a transmitter configured to transmit a block acknowledgment message for the aggregated data unit after receiving the block acknowledgement request message, wherein the block acknowledgment message indicates reception of the single data unit intended for the apparatus.

23. The apparatus of claim 22, wherein the receiver is configured to receive the aggregated data unit during a transmission opportunity (TXOP) duration.

24. The apparatus of claim 22, wherein the block acknowledgement message comprises a bitmap comprising a bit indicating whether the data unit intended for the apparatus was successfully received.

25. The apparatus of claim 22, wherein each of the plurality of data units comprises a physical layer protocol data unit (PPDU).

26. An apparatus for wireless communication, the apparatus comprising:

means for receiving an aggregated data unit comprising a plurality of data units transmitted to a plurality of apparatuses, each of the plurality of the data units intended for a different one of the plurality of apparatuses, wherein the means for receiving the aggregated data unit comprises means for simultaneously receiving the plurality of data units;

means for receiving a block acknowledgement request message to request acknowledgement of a single data unit, intended for the apparatus, of the received plurality of data units; and means for transmitting a block acknowledgment message for the aggregated data unit after receiving the block acknowledgement request message, wherein the block acknowledgment message indicates reception of the single data unit intended for the apparatus.

27. The apparatus of claim 26, wherein the means for receiving the aggregated data unit comprises means for receiving the aggregated data unit during a transmission opportunity (TXOP) duration.

28. The apparatus of claim 26, wherein the block acknowledgement message comprises a bitmap comprising a bit indicating whether the data unit intended for the first apparatus was successfully received.

29. The apparatus of claim 26, wherein each of the plurality of data units comprises a physical layer protocol data unit (PPDU).

30. A computer readable storage device encoded thereon with instructions that when executed cause an apparatus to perform a method of wireless communication, said method comprising:

receiving, at a first apparatus of a plurality of apparatuses, an aggregated data unit comprising a plurality of data units transmitted to the plurality of apparatuses, each of the plurality of the data units intended for a different one of the plurality of apparatuses, wherein receiving the aggregated data unit comprises receiving the plurality of data units simultaneously;

receiving a block acknowledgement request message to request acknowledgement of a single data unit, intended for the first apparatus, of the received plurality of data units; and transmitting a block acknowledgment message for the aggregated data unit after receiving the block acknowledgement request message, wherein the block acknowledgment message indicates reception of the single data unit intended for the first apparatus.

31. An access terminal, comprising:

an antenna;

a receiver configured to:

receive an aggregated data unit comprising a plurality of data units transmitted to a plurality of access terminals, each of the plurality of the data units intended for a different one of the plurality of the access terminals, wherein the receiver is configured to simultaneously receive the plurality of data units;

receive a block acknowledgement request message to request acknowledgement of a single data unit, intended for the access terminal, of the received plurality of data units; and a transmitter configured to transmit via the antenna a block acknowledgment message for the aggregated data unit after receiving the block acknowledgement request message, wherein the block acknowledgment message indicates reception of the single data unit intended for the access terminal.

* * * * *